Jan. 11, 1949. W. A. RAY Re. 23,077

CONTROL APPARATUS

Original Filed May 20, 1941 3 Sheets-Sheet 1

Inventor,
WILLIAM A. RAY,

By John H. Rouse,
Attorney

Jan. 11, 1949. W. A. RAY Re. 23,077

CONTROL APPARATUS

Original Filed May 20, 1941 3 Sheets-Sheet 2

Inventor,
WILLIAM A. RAY
By John H. Rowe,
Attorney

Jan. 11, 1949. W. A. RAY Re. 23,077

CONTROL APPARATUS

Original Filed May 20, 1941 3 Sheets-Sheet 3

Inventor,
WILLIAM A. RAY
By John H. Rouse,
Attorney

Reissued Jan. 11, 1949

Re. 23,077

UNITED STATES PATENT OFFICE 23,077

CONTROL APPARATUS

William A. Ray, North Hollywood, Calif., assignor to General Controls Co., a corporation Original No. 2,381,926, dated August 14, 1945, Serial No. 394,338, May 20, 1941. Application for reissue September 16, 1946, Serial No. 697,171

15 Claims. (Cl. 74—1)

My present invention relates to control apparatus and particularly to improvements in apparatus of the type wherein means are provided for preventing actuation of a control device, such as a closure member, switching means, or the like, in the absence of a condition which should be established before the device is actuated. Such a condition may be, for example, one of predetermined temperature or pressure, or existence of flame at a pilot burner. Upon undesired change in the condition after the device is actuated, it is automatically returned to a "safe" position.

It is an object of my present invention to provide in control apparatus of the type indicated, means continuously interconnecting the device to be actuated and a member for actuating the same; which means can be rendered effective to transmit movement of the member to the device only while a predetermined condition exists.

Another object is to provide, in control apparatus of the type indicated, a pair of continuously interconnected and relatively-movable elements whereby movement of the actuating member can be transmitted to the device to be actuated only when the movement of one of the elements relative to the other is modified.

Another object is to provide, in control apparatus of the type indicated, a gear system of the planetary type continuously interconnecting the device to be actuated and the actuating member.

Other objects and advantages of the invention will be found in the description, the drawings, and the appended claims.

For complete understanding of the invention, reference may be had to the following detailed description and accompanying drawings, wherein.

Figure 5:
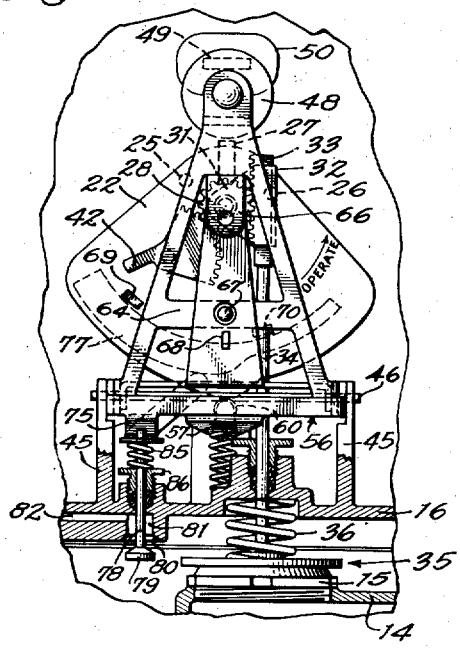
Figure 5 is a fragmentary view similar to that of Fig. 4 but showing the parts in the positions which they assume at an intermediate point of actuation.
Figure 8:
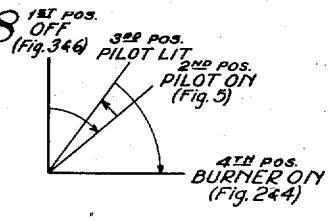
Figure 8 is a chart indicating the relative angular positions of the actuating member at various points of actuation.
Figure 7:
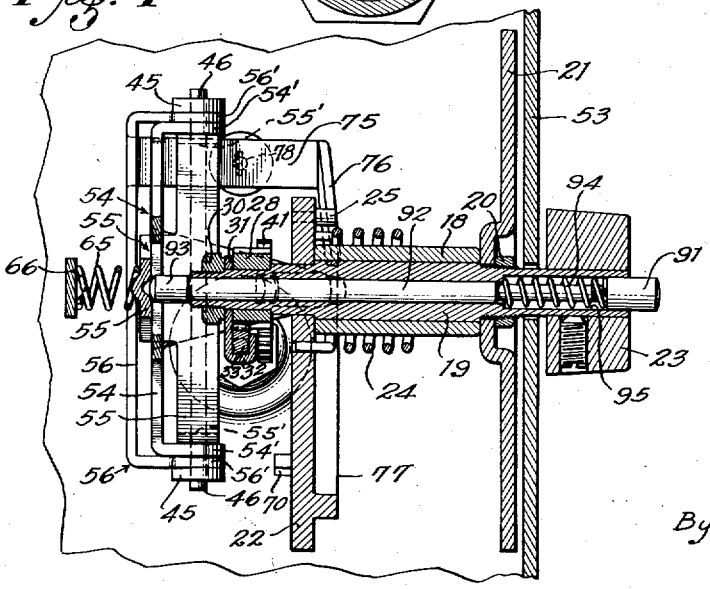
Figure 7 is an enlarged fragmentary section taken along the line 7—7 of Fig. 2.

In the drawings, the numeral 11 indicates a valve casing having an inlet 12 and an outlet 13 separated by a partition 14, in an opening in which is threaded a valve seat member 15. Provided over an opening in the upper surface of the casing is a cover member 16. Extending from a right-hand upper surface of the cover (Figs. 2 and 3) is an elongated bracket 17. As best seen in Fig. 7, the thickened upper portion 18 of the bracket is bored to receive a shaft 19, to a reduced right-hand portion of which is secured, by a nut 20, an indicating disk 21. Pressed on a left-hand squared portion 29 of shaft 19 is a cam plate 22. The length of the portion of shaft 19 between disk 21 and cam plate 22 is such that the shaft is freely rotatable in the bracket portion 18. Secured to the reduced right-hand extremity of shaft 19 is a knob 23 for manual actuation of the device. The shaft is biased in a clockwise direction, as viewed from the back in Figs. 4, 5 and 6, by a torsion spring 24 secured at one end to the bracket 17 and at its other end to the cam plate, pins 25 and 26 limiting the rotation of the shaft by respective engagement with a lug 21 extending from the upper surface of the bracket portion 18.

A free fit on a reduced cylindrical left-hand end portion of shaft 19 is an idler gear 28, axial movement of which is limited by the shoulder of squared portion 29 and a nut 30 threaded on the left-hand extremity of shaft 19. Interposed between the gear and the nut, and a free fit on shaft 19, is a plate 31, the outer end of which is bent to provide a U-shaped portion 32 which serves to maintain, intermeshed with a portion of gear 28, a gear rack 33 provided on the upper end of a rod 34. The lower end portion of this rod extends through, and is guided in, a thickened portion of the cover member 16 and carries at its bottom a main closure member 35 cooperable with the seat member 15. Blasting rod 34 downward, and the closure member toward its seat, is a compression spring 36.

Pivoted on a pin 40 extending from the left-hand, or rear, surface of cam plate 22 is a gear segment 41 which intermeshes with another portion of idler gear 28. Integral with and extending from a rear portion of the segment is a finger 42. When the shaft 19 is rotated from its normal position shown in Figs. 3 and 6, to which it is biased by spring 24, gear segment 41 is rotated about its pivot since the idler gear 28 is held from rotation by the engagement therewith of rack 33, which in turn is restrained from movement by the force of bias spring 36. It is thus seen that when segment 41 can revolve freely around the gear 28, rotation of shaft 19 does not effect actuation of the closure rod 34; the gear, rack, and segment constituting effectively a planetary gear system. It will be understood therefore that in order to effect actuation of the closure member it is necessary to modify the movement of segment 41 relative to gear 28 to place the segment in driving relation to the gear; means for so doing hereinafter being described.

Figure 2:
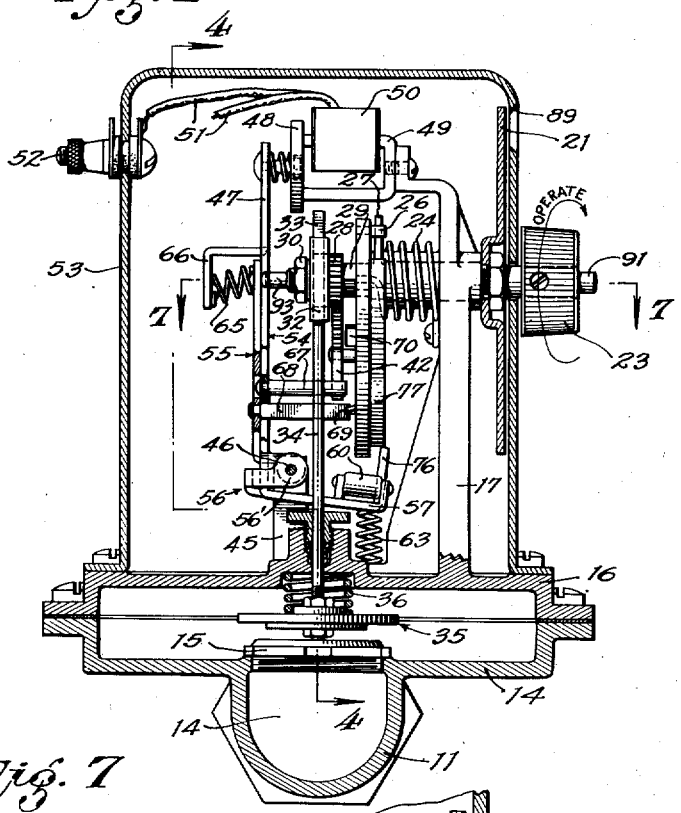
Figure 2 is a vertical section taken along the line 2—2 of Fig. 1 showing the parts in their fully actuated positions.
Figure 6:
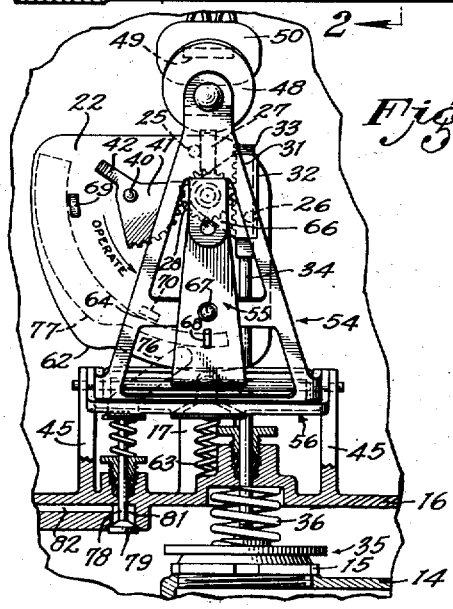
Figure 6 is a fragmentary section taken generally along the line 6—6 of Fig. 3.

Extending from the upper surface of cover 16 is a pair of brackets 45, the upper ends of which serve to support a rod 46. Pivoted on this rod, with their respective opposite-end supporting ear portions 54', 55', and 56' in abutting relation, are three relatively movably levers 54, 55 and 56. Carried by the extremity of the upper A-shaped arm portion 47 of lever 54 is a disk-shaped armature member 48, rockably mounted thereon and cooperable with the pole faces of a U-shaped core 49, on one leg of which is provided an energizing coil 50, the leads 51 of which extend to terminals 52 insulatingly mounted in a side wall of a housing 53 provided for the enclosure of the parts. The electromagnet, comprising core 49 and coil 50, is rigidly mounted on a bent upper extension of the bracket 17. The lower end arm portion 57 of lever 54 is bent laterally below its pivot on rod 46 and is provided with upwardly-turned portions 58 and 59 between which a roller 60 is pivotally mounted on a pin 61. Roller 60 normally rests on the lower right-hand concentric edge portion of cam plate 22. When the plate 22 is rotated from its normal position as shown in Fig. 6, the roller is depressed by its engagement with an eccentric projection 62 formed on the edge of the plate, thereby rocking lever 54 so that its arm 47 assumes a vertical position (as shown in Fig. 2) with armature 48 in engagement with core 49. If the core 49 is energized the armature 48 will be magnetically retained in engagement therewith, thereby holding lever 54 against the force of a spring 63 compressed against arm 57 of this lever.

In the movement of arm 47 to its vertical position, lever 55 is carried therewith, the upper portion of this lever normally being held in engagement with the cross-bar 64 of arm 47 by the force of a spring 65 compressed between the upper end of lever 55 and a bracket 66 turned up from the arm 47. Riveted to the cross-bar 64 of arm 47 is a laterally extending pin 67, the free end of which, when arm 47 is in vertical position, is adapted to be engaged by the finger 42 of segment 41 in the rotation of plate 22. Riveted to an intermediate upper portion of lever 55 and extending through the opening below cross-bar 64 of arm 47 is a pin 68, rectangular in cross-section, the free end of which is adapted to be engaged by either of catches 69 or 70, formed on the rear surface of cam plate 22, when this plate is rotated and arm 47 is in vertical position with lever 55 held in engagement therewith, as will further be described in connection with the operation of the device.

Figure 9:
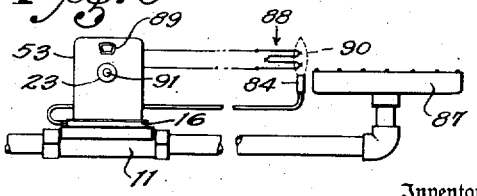
Figure 9 is a generally diagrammatic view of a gas burner control system including the valve shown in the other figures.

The other lever 56 comprises a horizontal arm 75 (best seen in Fig. 7) the free end portion of which is upwardly bent to provide a finger 76 which is adapted to engage the undersurface of an additional cam 77 formed as an extension of the front surface of plate 22. Engaging the underside of arm 75 is the upper end of a supplemental valve stem 78 which extends downwardly through an opening in the cover 16 and is provided at its lower end with a supplemental valve head 79 cooperable with a valve seat 80 formed around an opening 81 in the bottom of a thickened portion of the cover. The opening 81 communicates by a passageway 82 with the periphery of the cover 16, a fitting 83 being provided for connecting the supplemental valve to supply fuel to a pilot burner 84 shown in Fig. 9. The supplemental valve head 79 is urged to closed position by a spring 85 compressed between gland nut 86 and a washer secured to the upper end of stem 78; the force of this spring also serving to hold finger 76 in a position wherein it is just out of engagement with the underside of the right-hand reduced concentric portion of cam 77. In Fig. 9, the device is shown connected to supply fuel to pilot burner 84 and to a main burner 87; a thermoelectric device 88, comprising a plurality of thermocouples the hot junctions of which are heated by the pilot burner flame 90, being provided for the energization of electromagnet coil 50.

Figure 1:
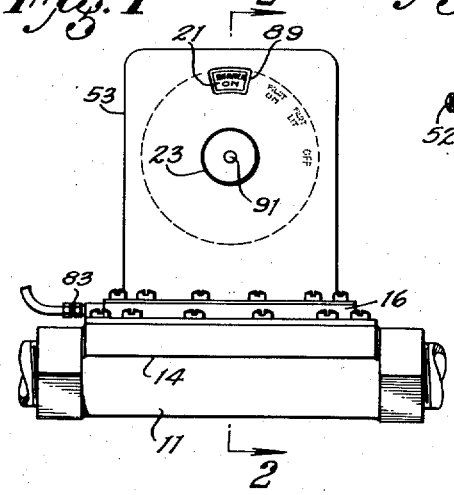
Figure 1 is a front elevation of a fluid control valve embodying my invention.
Figure 3:
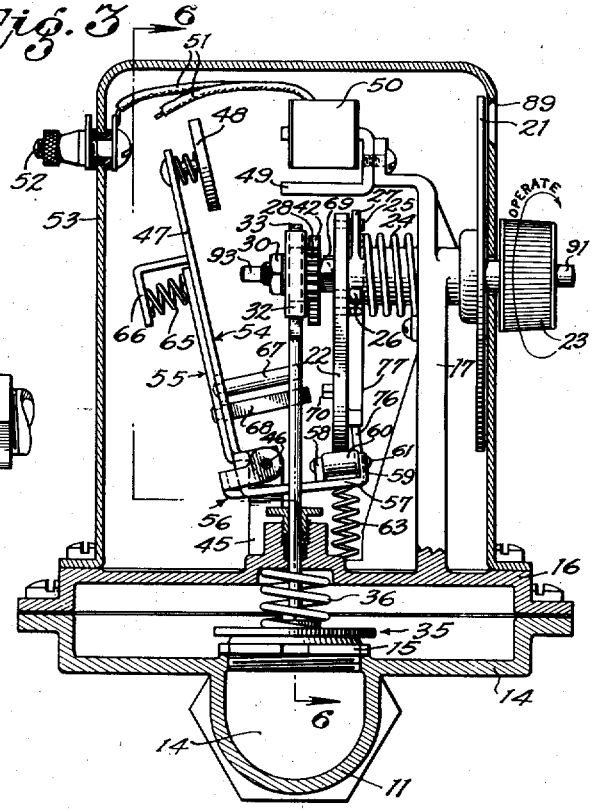
Figure 3 is a view similar to that of Fig. 2 but showing the parts in their normal, or unactuated, positions.
Figure 4:
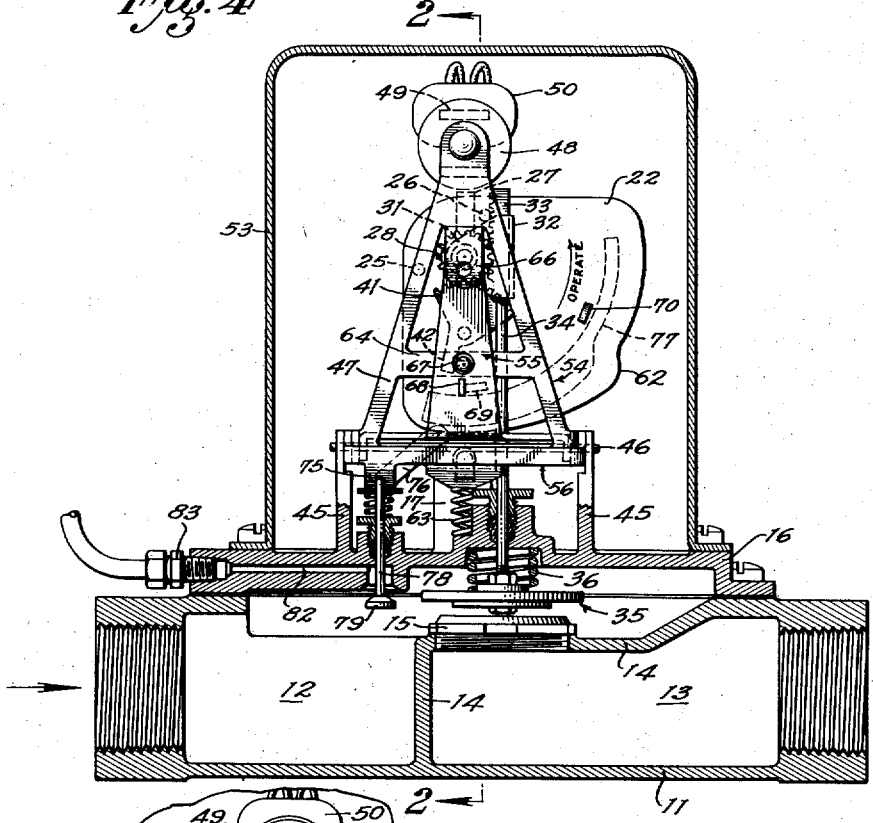
Figure 4 is a vertical section taken generally along the line 4—4 of Fig. 2.

Assuming that the device is connected as shown in Fig. 9 and that the pilot burner flame is extinguished, the parts will be in the positions shown in Figs. 3 and 6 due to the deenergization of coil 50. To initiate operation of the burner system, knob 23 is turned in the direction of its arrow so that plate 22 is rotated in a clockwise direction as viewed in Figs. 4, 5 and 6. In the rotation of knob 22, successive legend-bearing portions of disk 21 become visible through a window 89 formed in the front wall of housing 53. These legends are shown in Fig. 1 and are intended for the guidance of the operator in setting the device. When, in initiation of operation, the legend "Pilot on" appears, the knob is manually retained in that position, the various parts being in the positions shown in Fig. 5 with the supplemental valve head 79 in open position due to the engagement of finger 76 with the enlarged concentric portion of cam 77, which engagement effected downward movement of the supplemental valve stem through arm 75. In the movement of the parts to "Pilot on" position, by the engagement of cam projection 62 with roller 60, arm 47 was brought to vertical position with armature 48 in engagement with core 49. Gas now flowing to the pilot burner 84 is lighted and, when the thermoelectric device 88 has become sufficiently heated to generate current in an amount sufficient to cause core 49 to magnetically hold armature 48, the knob may be released. When this is done, the parts, under the influence of spring 24, tend to reassume their normal positions. However, movement in that direction is arrested by the engagement of catch 70 on plate 22 with the pin 68, which pin was moved into engaging position when arm 47 was brought to vertical position and is now magnetically retained in that position due to the force of spring 65 which holds lever 55 (to which pin 68 is attached) in engagement with arm 47. With the parts in the positions now assumed, finger 76 still being on the enlarged portion of cam 77, fuel continues to flow to the pilot burner, which condition is indicated by the appearance of the legend "Pilot lit" in the window.

If, for some reason, it should now be desirable to extinguish the pilot burner, this may be done by depressing a push button 91 provided in an opening 95 (Fig. 7) formed in the outer end portion of stem 19 to which knob 23 is secured. This button is mounted on a rod 92 which extends through a central bore in stem 19 and is provided beyond the left-hand end of the stem with a head 93 which is adapted to engage an upper end portion of lever 55, the head passing through an open area of arm 47. Button 91 is biased outwardly by a spring 94 compressed between the button and a shoulder formed at the inner end of opening 95. When arm 47 is in its magnetically held position, depression of push button 91 moves lever 55 with respect to arm 47 against the bias of spring 65 so that pin 68 is moved out of engagement with catch 70, thereby permitting the parts to return to their normal position which is then indicated by the legend "Off." Finger 73 now being out of engagement with the enlarged portion of cam 77, the supplemental valve is closed. Due to the resultant extinction of the pilot burner flame, the thermoelectric device starts to cool. However, under ordinary conditions, current will still be generated for a period of about 30 seconds in an amount sufficient to magnetically retain the armature in engagement with the core. Should reactuation of the device be attempted during this period, such actuation will be prevented by the engagement of the catch 70 with fingers 68, both sides of this catch being straight as indicated. When, due to sufficient cooling of the thermoelectric device, arm 47 is released, reinitiation of operation of the device may be effected as described above, pin 68 now being out of the path of movement of catch 70 (until after passage of the same).

With the parts in "Pilot lit" position, continued rotation of knob 23 in its "operating" direction will bring the finger 42 of the gear segment 41 into engagement with pin 67. After such engagement, continued rotation of the knob will cause the segment to rotate the idler gear 28 which, by its engagement with rack 33, will effect upward movement of the main closure stem 34 against the bias of spring 36. Toward the limit of rotation of plate 22, the other catch 69, because of its inclined leading edge, will pass pin 68, lever 55 being momentarily moved out of engagement with arm 47 in this movement. Therefore, when the knob is released, the parts will be retained in the positions shown in Figs. 2 and 4, with the straight side of catch 69 in engagement with pin 68. In this position, as indicated by the legend "Burner on," both the main valve and the supplemental valve are in open position.

It will be observed that, under all conditions of operation, the gear segment 41 is rotatable about its pivot and movable relative to the gear 28. When the arm 54 is not magnetically held and the pin 67, carried by that arm, is therefore out of the path of movement of the finger 42 of segment 41, the segment revolves freely around the gear 28; but when the arm 54 is in its magnetically-held vertical position and segment 41 is brought into engagement with pin 67, subsequent movement of the segment relative to gear 28 is so modified that the gear is then driven by the segment.

Should it be desired to close the main burner valve; while holding knob 23, push button 91 is momentarily depressed sufficiently to release catch 69 and the parts are then permitted to return, under the bias of spring 24, to the "Pilot lit" position with catch 70 in engagement with pin 68. Failure of the pilot burner flame, while the device is in either "Burner on" or "Pilot lit" position, effects return of the device to its "Off" position due to the release of catches 69 and 70 when arm 47 is released upon deenergization of the holding core, the bias springs of both the main and supplemental valves then being effective to return the valves to closed position. If, without lighting the pilot burner, the knob is turned to the "Burner on" position, actuation of the main closure member will not be effected since the pin 67 is then out of the path of movement of segment 41, and upon release of the knob the parts will immediately return to their normal positions. It will be noted that since the pilot burner is supplied with fuel in the "Burner on" position, if the pilot burner is then lighted and the parts are retained in "Burner on" position long enough to permit sufficient heating of the thermoelectric device, upon release the parts will be arrested in the "Pilot lit" position, since in the backward movement of plate 22 the armature is momentarily brought into engagement with its core and is then magnetically held. It will be noted that the cam surface of plate 22 recedes at the left-hand side of projection 62, so that when the electromagnet is deenergized arm 47 can fall away at any position of the cam other than that in which projection 62 is in engagement with roller 60. If it were desired to hold the main closure member in positions intermediate its full-on and closed positions, that could readily be accomplished by providing additional catches positioned between catches 69 and 70 on plate 22.

While I have herein shown and described, by way of illustration, a specific embodiment of my invention as applied to the control of a fuel valve, it is to be understood that the invention is also capable of various other applications and that modifications may be made without departing from the spirit of the invention. I intend therefore that my invention be limited only by the scope of the appended claims.

I claim as my invention:

1. In a condition control apparatus: a device to be actuated; an actuating member; means interconnecting said device and said member and including a pair of continuously-interconnected elements one of which is continuously responsive to movement of said member, said elements being normally so movable relative to each other that movement of said one of the elements is ineffective to actuate said device; means maintaining said one of the elements in potential driving relation to the other of said elements; and means, responsive to a condition of said apparatus which must be maintained during the entire period of operation thereof, for so controlling the operation of said one of said elements that it is capable of imparting movement to the other of said elements to permit actuation of the device by the member, only while said required condition exists.

2. In a condition control apparatus: a device to be actuated; an actuating member; means interconnecting said device and said member, and including a driving element and another element continuously interengaged with the driving element and driven thereby when said device is actuated by said member, said driving element being continuously responsive to movement of said member and normally so movable relative to said other element that movement of the driving element is ineffective to actuate said device; means maintaining said driving element in potential driving relation to said other element; and means, responsive to a condition of said apparatus which must be maintained during the entire period of operation thereof, for rendering said driving element effective to drive said other element, only while said required condition exists.

3. In a condition control apparatus: a device to be actuated; an actuating member; means interconnecting said device and said member, and including a driving element and another element continuously interengaged with the driving element and driven thereby when said device is actuated by said member, said driving element being continuously responsive to movement of said member and normally so movable relative to said other element that movement of the driving element is ineffective to actuate said device; means maintaining said driving element in potential driving relation to said other element; and means, responsive to a condition of said apparatus which must be maintained during the entire period of operation thereof, for so modifying the movement of said driving element relative to said other element as to permit actuation of the device by the member, only while said required condition exists.

4. In a condition control apparatus: a device to be actuated; an actuating member; means interconnecting said device and said member and including a pair of continuously-intermeshed gear elements one of which is continuously responsive to movement of said member, said elements being normally so movable relative to each other that movement of said one of the elements is ineffective to actuate said device; and means, responsive to a condition of said apparatus which must be maintained during the entire period of operation thereof, for so controlling the operation of said one of said gear elements that it is capable of imparting movement to the other of said gear elements to permit actuation of the device by the member, only while said required condition exists.

5. In a condition control apparatus: a device to be actuated; an actuating member; means interconnecting said device and said member, and including a driving element and another element continuously interengaged with the driving element and driven thereby when said device is actuated by said member, said driving element being continuously responsive to movement of said member and normally so movable relative to said other element that movement of the driving element is ineffective to actuate said device; means maintaining said driving element in potential driving relation to said other element; and means, responsive to a condition of said apparatus which must be maintained during the entire period of operation thereof, and effective in the initial actuation of said member to so control the operation of said driving element that it is capable of driving said other element to effect actuation of said device by subsequent actuation of the member, only while said required condition exists.

6. In a condition control apparatus: a device to be actuated; an actuating member; a pair of continuously interengaged and relatively-movable elements, one of which is continuously responsive to movement of said member, so interconnecting said member and said device that only when the movement of said one of the elements relative to the other is modified to place it in driving relation to the other does actuation of said member effect actuation of said device; means operated by the initial actuation of said member, without effecting actuation of said device, for temporarily establishing a condition that is a prerequisite of said modification of movement of said one of the elements; and means, responsive to a condition of said apparatus which must be maintained during the entire period of operation thereof, for maintaining said last-named means in said condition-establishing condition so that subsequent actuation of said member effects actuation of said device, only while said required condition exists.

7. In a condition control apparatus: a device to be actuated; an actuating member; a pair of continuously intermeshed and relatively-movable gear elements, one of which is continuously responsive to movement of said member, so interconnecting said member and said device that only when the movement of said one of the gear elements relative to the other is modified to place it in driving relation to the other does actuation of said member effect actuation of said device; means operated by the initial actuation of said member, without effecting actuation of said device, for temporarily establishing a condition that is a prerequisite of said modification of movement of said one of the gear elements; and means, responsive to a condition of said apparatus which must be maintained during the entire period of operation thereof, for maintaining said last-named means in said condition-establishing condition so that subsequent actuation of said member effects actuation of said device, only while said required condition exists.

8. In a condition control apparatus: a device to be actuated; an actuating member; a pair of continuously interconnected and relatively-movable elements, one of which is continuously responsive to movement of said member, interconnecting said device and said member, said elements being normally so relatively movable that movement of said one of the elements is ineffective to actuate said device; means temporarily moved, by initial actuation of said member, to a position wherein said normal relative-movement of said elements is modified to place said one of the elements in driving relation to the other so that subsequent actuation of the member can effect actuation of the device; electromagnetic means for maintaining said last-named means in said position; and means, responsive to a condition of said apparatus which must be maintained during the entire period of operation thereof, for controlling the energization of said electromagnetic means.

9. In a condition control apparatus: a device to be actuated; an actuating member; a pair of continuously interengaged and relatively-movable elements, one of which is continuously responsive to movement of said member, interconnecting said device and said member, said elements being normally so relatively movable that movement of said one of the elements is ineffective to actuate said device; said member including means forming a cam; means, momentarily operated by said cam upon initial actuation of said member, for modifying said normal relative-movement of said elements to place said one of the elements in driving relation to the other so that subsequent actuation of the member can effect actuation of the device; electromagnetic means for maintaining said cam-operated means in said modifying condition; and means, responsive to a condition of said apparatus which must be maintained during the entire period of operation thereof, for controlling the energization of said electromagnetic means.

10. In a condition control apparatus: a device to be actuated; an actuating member; a first and a second gear element carried respectively by said member and said device; an idler gear interconnecting said first and said second gear elements; means, operated by initial actuation of said member, for temporarily rendering said first gear element effective to operate, through said idler gear, said second gear element; and means, responsive to a condition of said apparatus which must be maintained during the entire period of operation thereof, for maintaining said last-named means in operative condition.

11. In a condition control apparatus: a device to be actuated; a rotatable actuating member; a first gear element pivotally mounted on said member at a point eccentric to the axis of rotation of the member; a second gear element fixed to said device; an idler gear interconnecting said first and said second gear elements; means, operated by initial rotation of said member, for temporarily rendering said first gear element effective to operate, through said idler gear, said second gear element; and means, responsive to a condition of said apparatus which must be maintained during the entire period of operation thereof, for maintaining said last-named means in operative condition.

12. In a condition control apparatus: a device to be actuated; an actuating member; means biasing said member to unactuated position; a pair of continuously interengaged and relatively-movable elements, one of which is continuously responsive to movement of said member, interconnecting said device and said member, said elements being normally so relatively movable that movement of said one of the elements is ineffective to actuate said device; said member including means forming a cam; means, momentarily operated by said cam upon initial actuation of said member, for modifying said normal relative-movement of said elements to place said one of the elements in driving relation to the other so that subsequent actuation of the member can effect actuation of the device; electromagnetic means for maintaining said cam-operated means in said modifying condition; means, responsive to a condition of said apparatus which must be maintained during the entire period of operation thereof, for controlling the energization of said electromagnetic means; and means for preventing return of said member to unactuated position under the influence of said bias while said cam-operated means is maintained in said modifying condition.

13. In a condition control apparatus: a device to be actuated; an actuating member; a pair of continuously interconnected and normally relatively-movable elements, one of which is continuously responsive to movement of said member, so interconnecting said member and said device that only when the movement of said one of the elements relative to the other is modified does actuation of said member effect actuation of said device; means, including a movable arm, for modifying said normal relative-movement of said elements to place said one of the elements in driving relation to the other, when the arm is in a predetermined position, so that subsequent actuation of said member can effect actuation of said device; means operated by initial actuation of said member, without effecting actuation of said device, for moving said arm to said position; and means responsive to a condition of said apparatus which must be maintained during the entire period of operation thereof, for maintaining said arm in said position.

14. In a condition control apparatus: a device to be actuated; an actuating member; a pair of continuously interconnected and normally relatively-movable elements, one of which is continuously responsive to movement of said member, so interconnecting said member and said device that only when the movement of said one of the elements relative to the other is modified does actuation of said member effect actuation of said device; means, including a movable arm, for modifying said normal relative-movement of said elements to place said one of the elements in driving relation to the other, when the arm is in a predetermined position, so that subsequent actuation of said member can effect actuation of said device; means operated by initial actuation of said member, without effecting actuation of said device, for moving said arm to said position; means responsive to a condition of said apparatus which must be maintained during the entire period of operation thereof, for maintaining said arm in said position; means biasing said device to unactuated position and said member to a corresponding position; means carried by said movable arm and normally effective, while the arm is in said position, to maintain said device in actuated position against the force of said bias; and manually operable means for releasing said last-named means, without effecting movement of said arm from said position, so that, by the force of said bias, said device is returned to its unactuated position and said member to a corresponding position.

15. A condition control apparatus, as defined in claim 14; including means, associated with said actuating member, for indicating the position of said device.

WILLIAM A. RAY.

REFERENCES CITED

The following references are of record in the file of this patent:

UNITED STATES PATENTS

| Number | Name | Date |
|---|---|---|
| 1,913,541 | Griffith et al. | June 13, 1933 |
| 1,972,107 | Reynolds | Sept. 4, 1934 |
| 2,218,606 | Foster | Oct. 22, 1940 |
| 2,280,246 | McCullough | Apr. 21, 1942 |